US012687837B2

(12) United States Patent
Vanderzee et al.

(10) Patent No.: US 12,687,837 B2
(45) Date of Patent: Jul. 21, 2026

(54) GENERATION OF RPA PLATFORM DESIGN COMPONENTS FOR CONFIGURING RPA PLATFORMS

(71) Applicant: UiPath, Inc., New York, NY (US)

(72) Inventors: Matthew Vanderzee, Sammamish, WA (US); Mircea Grigore, Bucharest (RO)

(73) Assignee: UiPath, Inc., New York, NY (US)

( * ) Notice: Subject to any disclaimer, the term of this patent is extended or adjusted under 35 U.S.C. 154(b) by 775 days.

(21) Appl. No.: 17/449,094

(22) Filed: Sep. 28, 2021

(65) Prior Publication Data

US 2023/0101948 A1     Mar. 30, 2023

(51) Int. Cl.
*G06F 9/46* (2006.01)
*G05B 19/4155* (2006.01)
(52) U.S. Cl.
CPC ................... *G05B 19/4155* (2013.01); *G05B 2219/50391* (2013.01)
(58) Field of Classification Search
CPC ... G06F 1/329; G06F 9/46; G06F 9/48; G06F 9/4806; G06F 9/4837; G06F 9/4843; G06F 9/485; G06F 9/4881; G06F 9/4887
See application file for complete search history.

(56) References Cited

U.S. PATENT DOCUMENTS 9,910,761 B1     3/2018  Jules et al.
10,839,404 B2 *  11/2020  Ramamurthy ..... G06G 3/04847

| 2015/0294247 A1 | 10/2015 | Munakata et al. |
| 2017/0228119 A1 | 8/2017 | Hosbettu et al. |
| 2018/0370029 A1 | 12/2018 | Hall et al. |
| 2019/0324781 A1 | 10/2019 | Ramamurthy et al. |
| 2020/0206920 A1 | 7/2020 | Ma et al. |
| 2021/0072969 A1 | 3/2021 | Mei et al. |
| 2021/0110318 A1 | 4/2021 | Singh et al. |
| 2021/0122051 A1 | 4/2021 | An et al. |
| 2021/0142233 A1 | 5/2021 | Masood et al. |
| 2021/0158268 A1 | 5/2021 | Berg et al. |
| 2021/0162592 A1 | 6/2021 | Han et al. |

(Continued)

FOREIGN PATENT DOCUMENTS

| CN | 111242577 A | 6/2020 |
| CN | 111723294 A | 9/2020 |
| CN | 112070487 A | 12/2020 |

(Continued)

OTHER PUBLICATIONS

International Search Report and Written Opinion mailed Jun. 21, 2022 in connection with International Patent Application No. PCT/US2021/072167, 9 pgs.

(Continued)

*Primary Examiner* — Andy Ho
(74) *Attorney, Agent, or Firm* — Chiesa Shahinian & Giantomasi PC

(57) ABSTRACT

Systems and methods for configuring an RPA (robotic process automation) platform to perform a candidate process automation are provided. Discovery data relating to a candidate process automation is generated. RPA platform design components for configuring an RPA platform to perform the candidate process automation are generated based on the discovery data. The RPA platform design components are presented to a user via a user interface.

18 Claims, 8 Drawing Sheets

500

(56) References Cited

U.S. PATENT DOCUMENTS

| | | | | |
|---|---|---|---|---|
| 2022/0291966 A1* | 9/2022 | Masood | ................ | G06F 3/0486 |
| 2023/0037297 A1* | 2/2023 | Parasuraman | .......... | G06F 9/451 |

FOREIGN PATENT DOCUMENTS

| | | | |
|---|---|---|---|
| IN | 201841032794 A | 9/2019 |
| JP | 2015201103 A | 11/2015 |
| KR | 102190459 B1 | 12/2020 |

OTHER PUBLICATIONS

International Search Report and Written Opinion mailed Jun. 24, 2022 in connection with International Patent Application No. PCT/US2021/072164, 9 pgs.

Deviatykh, "Discovering Automatable Routines from UI Logs via Sequential Pattern Mining," 2020, Master's Thesis, University of Tartu, 49 pgs.

Non-Final Office Action mailed on Jun. 17, 2024 in connection with U.S. Appl. No. 17/449,093, filed Sep. 28, 2021, 11 pgs.

Anonymous, "Method and System for Robotoic Process Automation (RPA) Code Recommendation Using Combined Structured and Text Information", ip.com, 2021, 3 pgs.

Extended European Search Report mailed Jul. 11, 2025, in connection with European Patent Application No. 21823471.4, 12 pgs.

* cited by examiner

300

302

304    Conductor

306    DB Server

308

Indexer
Server

Robots

600

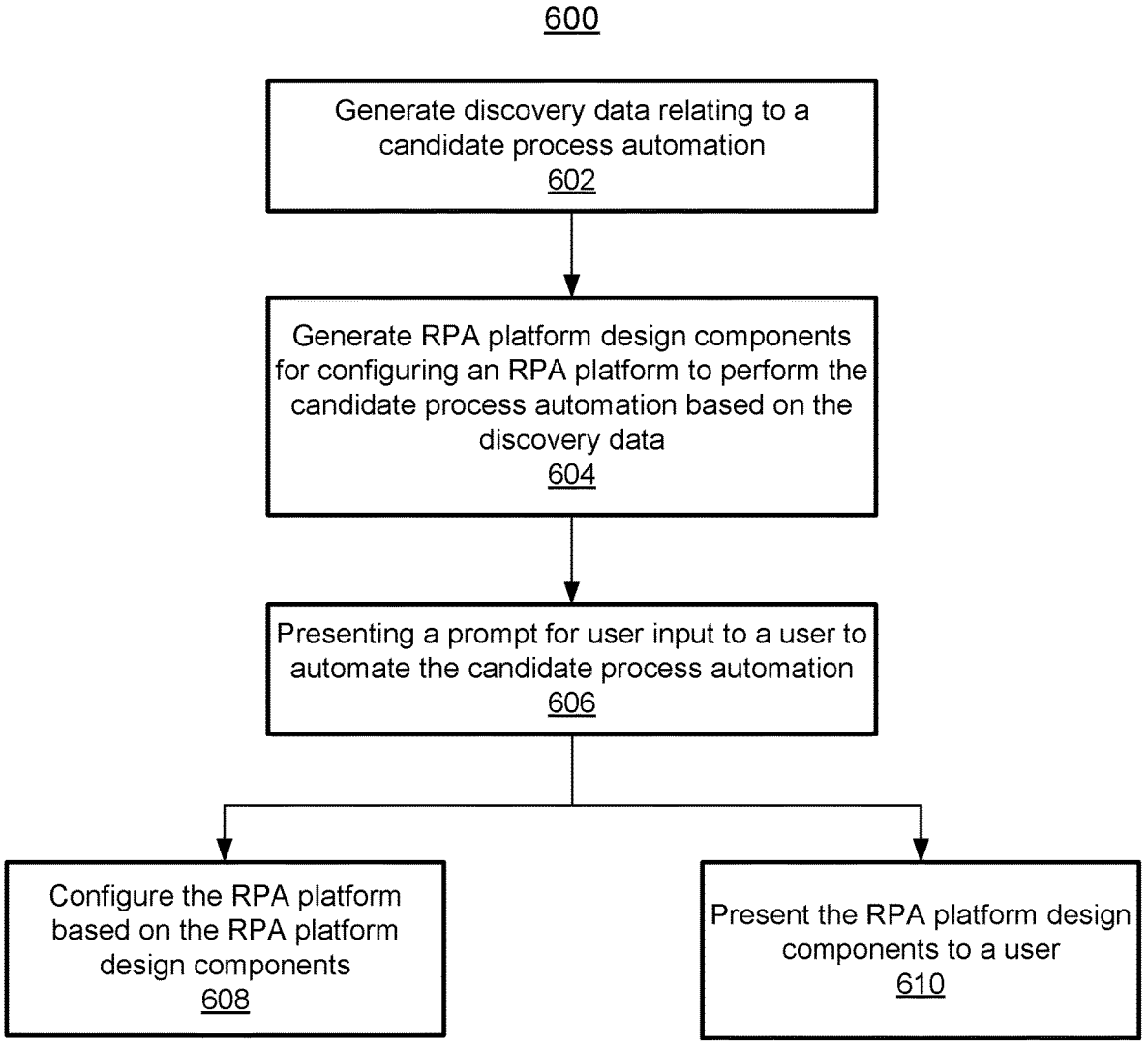

Generate discovery data relating to a candidate process automation
602

Generate RPA platform design components for configuring an RPA platform to perform the candidate process automation based on the discovery data
604

Presenting a prompt for user input to a user to automate the candidate process automation
606

Configure the RPA platform based on the RPA platform design components
608

Present the RPA platform design components to a user
610

GENERATION OF RPA PLATFORM DESIGN COMPONENTS FOR CONFIGURING RPA PLATFORMS

TECHNICAL FIELD

The present invention relates generally to RPA (robotic process automation), and more particularly to generation of RPA platform design components for configuring RPA platforms.

BACKGROUND

RPA (robotic process automation) is a form of process automation that uses software robots to automate workflows. RPA may be implemented to automate repetitive and/or labor-intensive tasks, thereby reducing costs and increasing efficiency. Conventionally, RPA is manually implemented by one or more users identifying automation opportunities, configuring RPA robots, evaluating performance of the RPA robots, etc. However, such manual implementation of RPA is a labor-intensive and time-consuming process.

BRIEF SUMMARY OF THE INVENTION

In accordance with one or more embodiments, systems and methods for generating RPA platform design components for configuring RPA platforms are provided. Discovery data relating to a candidate process automation is generated. RPA platform design components for configuring an RPA platform to perform the candidate process automation are generated based on the discovery data. The RPA platform design components are presented to a user via a user interface.

In one embodiment, the discovery data comprises a process graph. The process graph is generated by performing at least one of process mining or process capture. In another embodiment, the discovery data comprises a task graph. The task graph is generated by performing at least one of task mining or task capture.

In one embodiment, user input is received from the user defining a configuration of the RPA platform based on the RPA platform design components. In response to receiving the user input, the RPA platform is configured based on the configuration.

In one embodiment, the RPA platform design components comprise at least one of UI (user interface) objects repository, RPA activities, RPA applications, accelerators, or existing projects of the user. The RPA platform design components may be generated by pattern matching the discovery data to existing RPA platform design components.

In one embodiment, the candidate process automation task is automatically performed by the configured RPA platform. Additional discovery data relating to the performance of the candidate process automation is generated. Updated RPA platform design components are generated for configuring the RPA platform. The updated RPA platform design components are presented to a user.

These and other advantages of the invention will be apparent to those of ordinary skill in the art by reference to the following detailed description and the accompanying drawings.

BRIEF DESCRIPTION OF THE DRAWINGS

FIG. 6 shows a method for automatically configuring an RPA platform to perform a candidate process automation, in accordance with one or more embodiments;

DETAILED DESCRIPTION

Figure 1:
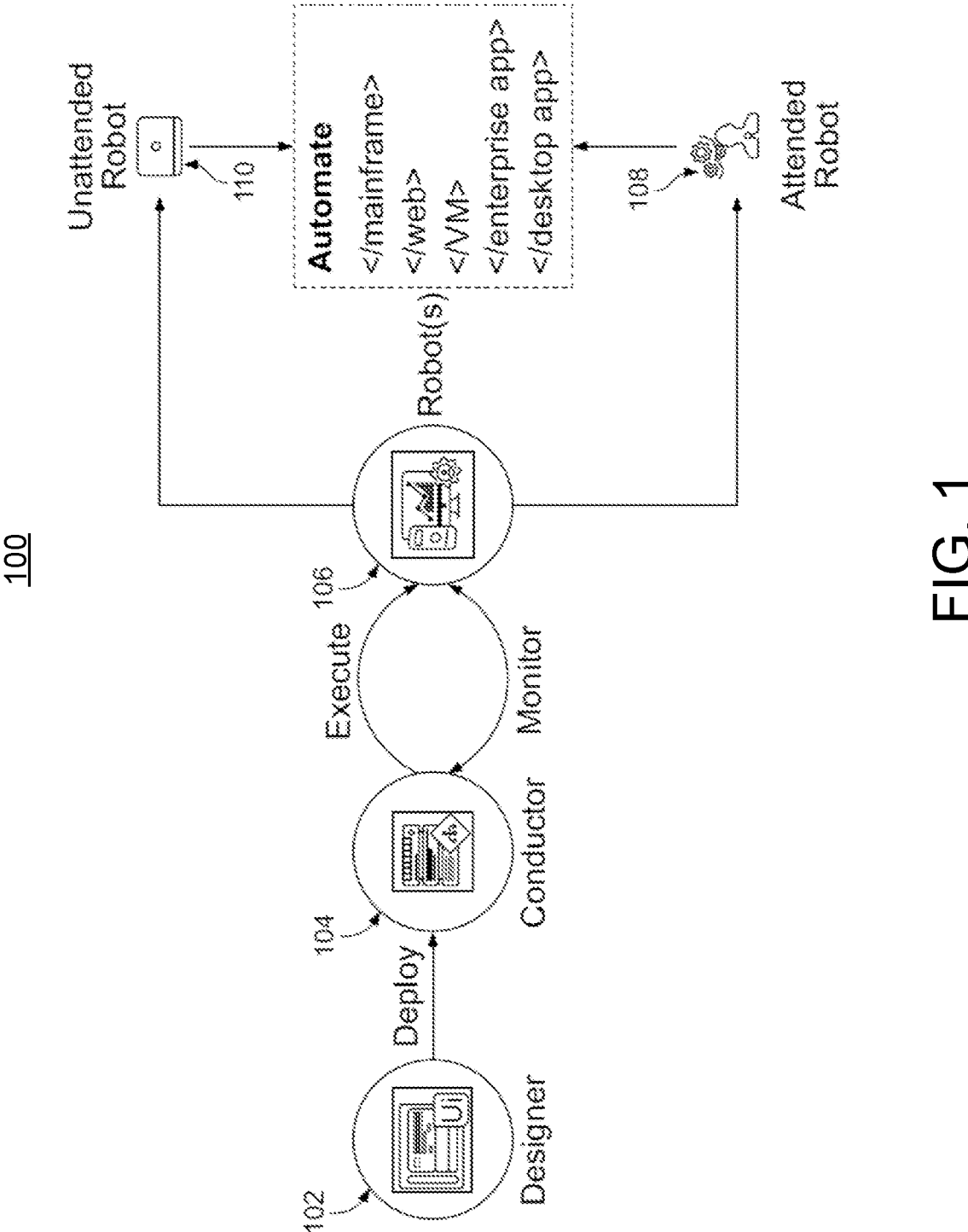
FIG. 1 is an architectural diagram illustrating a robotic process automation (RPA) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
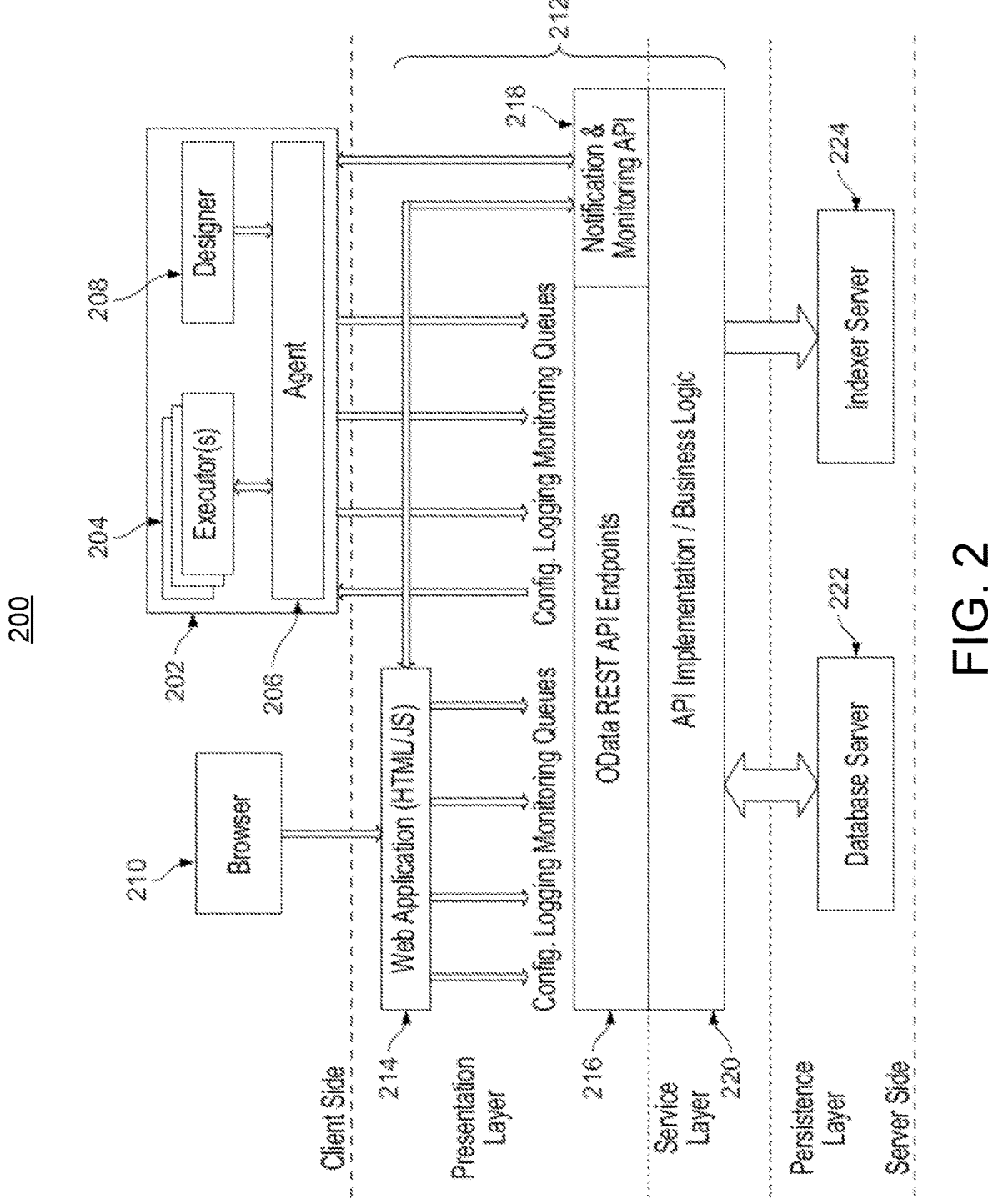
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
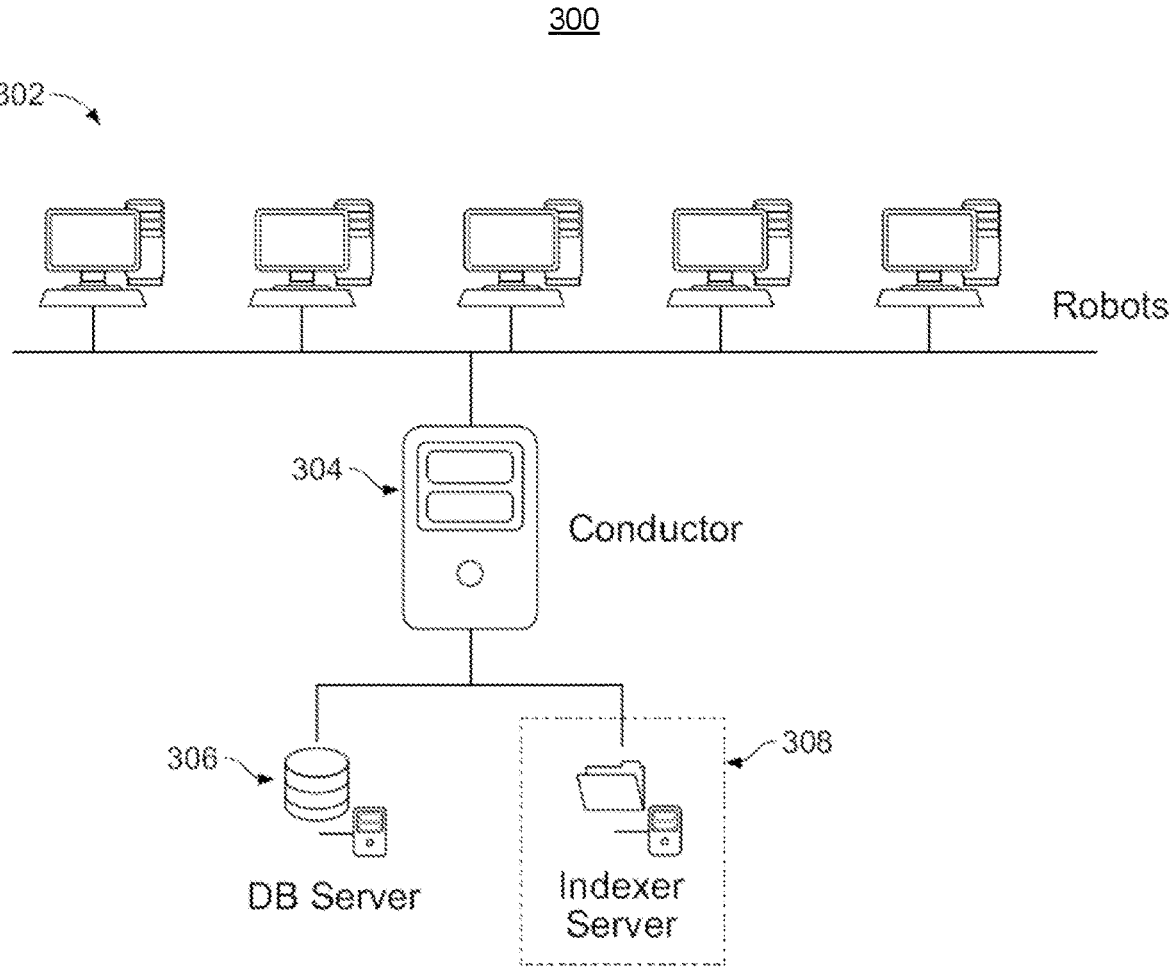
FIG. 3 is an architectural diagram illustrating a simplified deployment example of an RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 100 of FIG. 1, RPA system 200 of FIG. 2, and/or RPA system 300 of Figure may be implemented for cloud-based management of RPA robots. Such cloud-based management of RPA robots enables RPA to be provided as Software as a Service (SaaS). Accordingly, conductor 104 of FIG. 1, conductor 212 of FIG. 2, and/or conductor 304 of FIG. 3 is implemented in the cloud for cloud-based management of RPA robots to, e.g., create RPA robots, provision RPA robots, schedule tasks on RPA robots, decommission RPA robots, or effectuate any other orchestration task for managing RPA robots.

Figure 4:
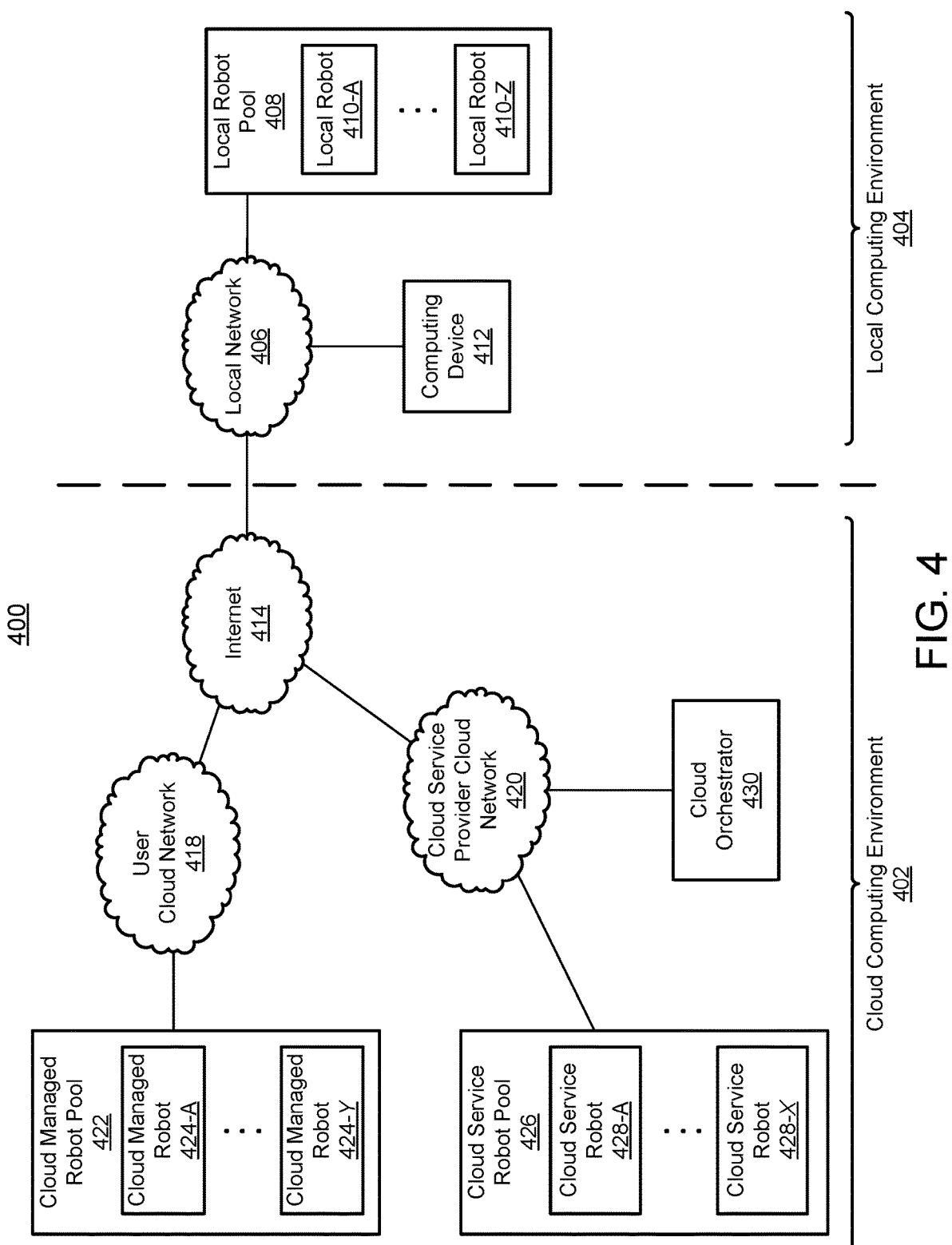
FIG. 4 shows an architecture diagram illustrating a cloud RPA system for implementing cloud-based management of robotic process automation robots, according to an embodiment of the invention.

FIG. 4 illustrates an architectural diagram of a cloud RPA system 400 for implementing cloud-based management of RPA robots, in accordance with one or more embodiments. Cloud RPA system 400 comprises a cloud computing environment 402 and a local computing environment 404. Local computing environment 404 represents a local network architecture of a user or any other entity or entities, such as, e.g., a company, a corporation, etc. Local computing environment 404 comprises local network 406. Cloud computing environment 402 represents a cloud computing network architecture that provides services or processing of workloads remote from the user at local computing environment 404. Cloud computing environment 402 comprises various cloud networks, including internet 414, user cloud network 418 representing a cloud network managed (or controlled) by the user and hosted by a cloud platform provider, and a cloud service provider cloud network 420 representing a cloud network managed by a cloud service provider and hosted by a cloud platform provider. The cloud service provider is an entity that provides services (e.g., RPA) via the cloud. The cloud platform provider is an entity that maintains cloud computing infrastructure. Local network 406 of local computing environment 404 is communicatively coupled to internet 414 of cloud computing environment 402 to facilitate communication between local computing environment 404 and cloud computing environment 402.

As shown in FIG. 4, a cloud orchestrator 430 is implemented in cloud computing environment 402 to enable cloud-based management of RPA robots. In particular, cloud orchestrator 430 is managed by a cloud service provider and hosted in cloud service provider cloud network 420 within cloud computing environment 402. In one embodiment, the cloud service provider provides RPA to the user in local computing environment 404.

Cloud orchestrator 430 manages RPA robots in cloud computing environment 402. In particular, the user interacts with computing device 412 in local computing environment 404 to transmit instructions for managing RPA robots to cloud orchestrator 430 in cloud computing environment 402. Alternatively, the user interacts with computing device 412 in local computing environment 404 to set a schedule on cloud orchestrator 430 to automatically transmit instructions on behalf of the user for managing RPA robots. Exemplary instructions for managing RPA robots include instructions for creating RPA robots, provisioning RPA robots, scheduling a task on RPA robots (e.g., schedule a time for performing the task and a type of robot to perform the task), decommissioning RPA robots, or any other orchestration instructions for RPA robots. In response to receiving the instructions, cloud orchestrator 430 effectuates the instructions by, e.g., creating the RPA robots, provisioning the RPA robots, scheduling the task of the RPA robot, decommissioning the RPA robots, etc. In one embodiment, cloud orchestrator 430 may be similar to conductor 104 of FIG. 1, conductor 212 of FIG. 2, or conductor 304 of FIG. 3, but implemented in cloud service provider cloud network 420 within cloud computing environment 402.

The RPA robots managed by cloud orchestrator 430 may include a pool of cloud robots that are deployed and maintained within cloud computing environment 402. Such cloud robots may include one or more cloud service robots 428-A, . . . , 428-X (hereinafter collectively referred to as cloud service robots 428) of cloud service robot pool 426 and one or more cloud managed robots 424-A, . . . , 424-Y (hereinafter collectively referred to as cloud managed robots 424) of cloud managed robot pool 422. Such cloud robots perform (i.e., process) tasks in cloud computing environment 402 and transmit results of the tasks to the user in local computing environment 404. Additionally or alternatively, the RPA robots managed by cloud orchestrator 430 may include one or more local robots 410-A, . . . , 410-Z (hereinafter collectively referred to as local robots 410) of local robot pool 408.

Cloud service robots 428 are maintained by the cloud service provider in cloud service provider cloud network 420 for performing RPA tasks in cloud computing environment 402 for the user in local network environment 404. Cloud service robots 428 are created upon request by the user sending instructions from computing device 412 to cloud orchestrator 430. Upon creation, cloud service robots 428 enter into a standby mode while waiting to perform a task (or workflow). While in standby mode, the cost for running the cloud service robots 428 is minimized or otherwise reduced. Tasks are scheduled on cloud service robots 428 by the user sending instructions from computing device 412 to cloud orchestrator 430. The instructions for scheduling tasks defines the time for performing the task and a type of robot for performing the task. Cloud service robots 428 wake up from standby mode to perform the task and return to standby mode once the task is complete. Accordingly, cloud service robots 428 perform the tasks on cloud service provider cloud network 420 for the user in local computing environment 404.

Cloud managed robots 424 are maintained by the user in a user cloud network 418 for performing RPA tasks in cloud computing environment 402 for the user in local network environment 404. Cloud managed robots 424 are similar in capability to cloud service robots 428 and are also hosted in cloud computing environment 402. However, user cloud network 418, upon which cloud managed robots 424 are hosted, is managed by the user while cloud service provider cloud network 420, upon which cloud service robots 428 are hosted, is managed by the cloud service provider and hosted by the cloud platform provider. Cloud orchestrator 430 manages cloud managed robots 424 by establishing a connection between cloud service provider cloud network 420 and user cloud network 418. User cloud network 418 may be established by the user utilizing cloud provider technology to tunnel back to local network 406. The user can establish a dedicated network connection from local network 406 to cloud service provider cloud network 420. Connectivity is typically in the form of, e.g., an any-to-any (e.g., internet protocol virtual private network) network, a point-to-point Ethernet network, or a virtual cross-connection through a connectivity provider at a co-location facility. These connections do not go over the public Internet. This offers more reliability, faster speeds, consistent latencies, and higher security than typical connections over the Internet. User cloud network 418 continues to be fully controlled and managed by the user, thereby providing stringent control over data to the user.

Once the connection between cloud service provider cloud network 420 and user cloud network 418 has been established, cloud managed robots 424 are created upon request by the user interacting with cloud orchestrator 430 via computing device 412. Cloud managed robots 424 are created on user cloud network 418. Accordingly, cloud managed robots 424 perform the tasks on user cloud network 418 for the user in local computing environment 404. Algorithms may be applied to maximize the utilization of the robots in cloud managed robot pool 422 and to reduce operating costs for the user.

Local robots 410 are maintained by the user in local network 406 for performing RPA tasks for the user in local network environment 404. Local network 406 is controlled or otherwise managed by the user. Cloud Orchestrator 430 maintains a connection to local robots 410 through standard HTTPS connectivity.

Embodiments described herein provide for the generation of RPA platform design components. In one embodiment, an RPA platform is configured to perform a candidate process automation based on the RPA platform design components. For example, the RPA platform may be automatically configured based on the RPA platform design components without requiring user input for designing, modifying, or accepting the configuration (e.g., in a designer such as studio). In another example, a candidate configuration of the RPA platform may be defined based on the RPA platform design components and presented to a user (e.g., a business user). The RPA platform is configured according to the candidate configuration upon receiving user input from the user accepting the candidate configuration. In another embodiment, the RPA platform design components are presented to a user (e.g., an RPA developer). User input is received from the user defining (e.g., in a designer such as studio) a configuration and the RPA platform is configured according to the configuration. Advantageously, the generation of RPA platform design components in accordance with embodiments described herein facilitates the configuration of RPA platforms by reducing the labor-intensive and time-consuming manual programming of RPA robots.

Figure 5:
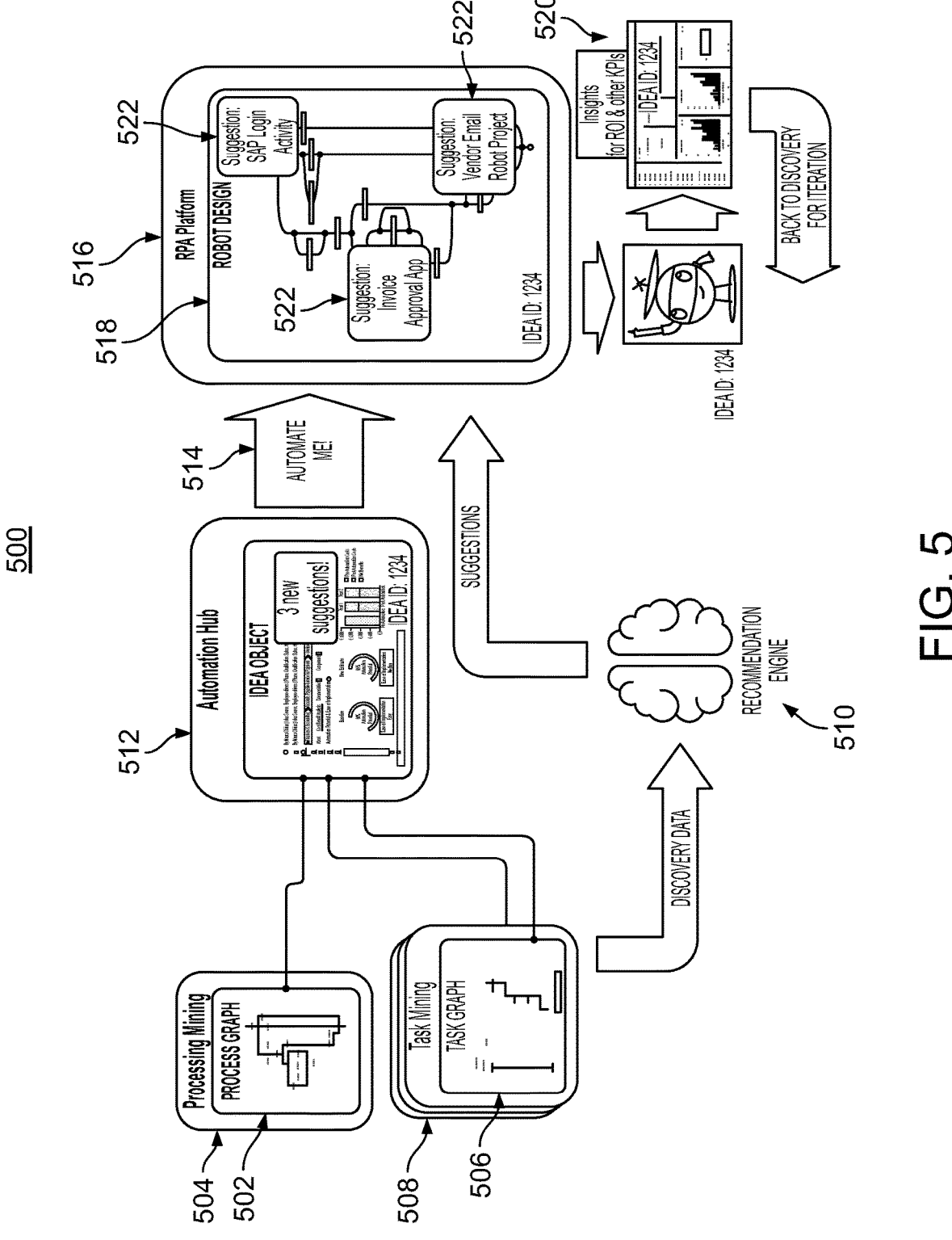
FIG. 5 shows a workflow for automatically configuring an RPA platform to perform a candidate process automation, in accordance with one or more embodiments.

FIG. 5 shows a workflow 500 for configuring an RPA platform to perform a candidate process automation, in accordance with one or more embodiments. FIG. 6 shows a method 600 for configuring an RPA platform to perform a candidate process automation, in accordance with one or more embodiments. FIG. 5 and FIG. 6 will be described together below. Method 600 may be performed by any suitable computing device or devices, such as, e.g., computing system 800 of FIG. 8. In one example, method 600 may be performed using RPA system 100 of FIG. 1, RPA system 200 of FIG. 2, RPA system 300 of FIG. 3, or cloud RPA system 400 of FIG. 4.

At step 602 of FIG. 6, discovery data relating to a candidate process automation is received. In one embodiment, the discovery data comprises a process graph of the candidate process automation. The process graph may be generated by performing process mining or process capture. Process mining refers to the automatic identification of RPA processes by monitoring enterprise systems for tracking relationships between RPA events. Process capture (also referred to as process discovery or process modeling) refers to designing enterprise processes based on user input (e.g., explicit user input or inferred user activity). Process graphs model system-level activities, such as, e.g., data transactions, API calls, and software events and processes. In another embodiment, the discovery data comprises a task graph of the candidate process automation. The task graph may be generated by performing task mining or task capture. Task mining refers to the automatic identification of RPA tasks by observing (e.g., real time or near real time monitoring or offline analysis) user input (e.g., explicit user input or inferred user activity) on applications. Task capture refers to the identification of tasks based on user input. Task graphs model user events, such as, e.g., mouse clicks, text entry, human-driven decisions, and the like. In another embodiment, the discovery data comprises both process graphs and task graphs.

The discovery data may comprise any other suitable data relating to the discovery of the candidate process automation, such as, e.g., contextual information. In one example shown in workflow 500 of FIG. 5, the discovery data comprises process graph 502 generated by process mining 504 and task graph 506 generated by task mining 508.

At step 604 of FIG. 6, RPA platform design components for configuring an RPA platform to perform the candidate process automation are generated based on the discovery data. In one example shown in workflow 500 of FIG. 5, recommendation engine 510 generates suggestions for RPA platform design components based on discovery data.

In one embodiment, the RPA platform design components may comprise one or more of UI (user interface) objects repository (e.g., domain models, existing RPA code, etc.), RPA activities, RPA applications, accelerators, or existing RPA projects of the user. In one example, if a certain user activity in the discovery data is known to correspond to an object, the object can be automatically integrated into the configuration of the RPA platform. For instance, if the user activity is detected to be editing the state of an Invoice object, the RPA platform can adopt Invoice Management capabilities. In another example, if patterns of steps in the discovery data match existing RPA activities, the steps can be replaced with the RPA activities in the configuration of the RPA platform. For instance, if the user is observed to be logging into a particular business system, the RPA platform can be augmented with a system login activity, versus manually programming that login. In a further example, if a certain part of a process in the discovery data is related to an existing application, that application can be integrated into the configuration of the RPA platform. For instance, certain common business software systems like SAP or Salesforce have existing RPA functionality, and so when the discovery data shows interactions with these systems, the RPA platform can be automatically configured to work directly with these systems (at the API level instead of the UI level, for example). In another example, a user's existing set of projects can be leveraged to ensure that the RPA platform is not duplicated. For instance, if the user or organization has already built an RPA Robot that is similar to the process in question, that match can be made and the preexisting RPA robot (or portions thereof) can be employed automatically. In one embodiment, the RPA platform design components comprises an existing configuration (in part or in whole) of the RPA platform. The RPA platform design components may be provided at various levels of granularity (e.g., from small components to a full configuration of the RPA platform from an existing configuration).

In one embodiment, the RPA platform design components are generated by pattern matching the discovery data to existing RPA platform design components. For example, since task graphs contain sequences of human activities, and user interface (UI) based robots execute activities in place of a human, mappings can be drawn between activities in the task graph and UI robot activities. As both the volume of task graph data and the number of robots increases, more matches can be drawn between these. The mapping may be performed in any suitable manner (e.g., using machine learning) and can be trained and improved over time based on user input. In another embodiment, the mappings may be suggested based on semantic heuristics. However, the RPA platform design components may be generated by any other suitable approach. As an example, task graphs and process graphs comprise both the sequence of activities involved in the process, as well as the semantic meaning of those activities. When the intent of an activity or set of activities can be interpreted in the discovery data, and an existing RPA robot activity can be found that achieves that intent, the RPA robot can employ this activity. For instance, often the process of filling out a complex claim form comprises numerous steps across multiple screens in a business system. The discovery data can identify that a large group of user activities is accomplishing a simple goal of completing a claim form, and thus if a "complete claim form" activity is available, it can replace all of the originating user activities.

At step 606 of FIG. 6, a prompt for user input is presented to a user to automate the candidate process automation. In one embodiment, the prompt is a selectable button or link displayed on a user interface and presented to the user. In one example shown in workflow 500 of FIG. 5, automation hub 512 presents various metrics for automating the candidate process automation based on the discovery data, as well as an "automate me" prompt 514 to the user.

Figure 7:
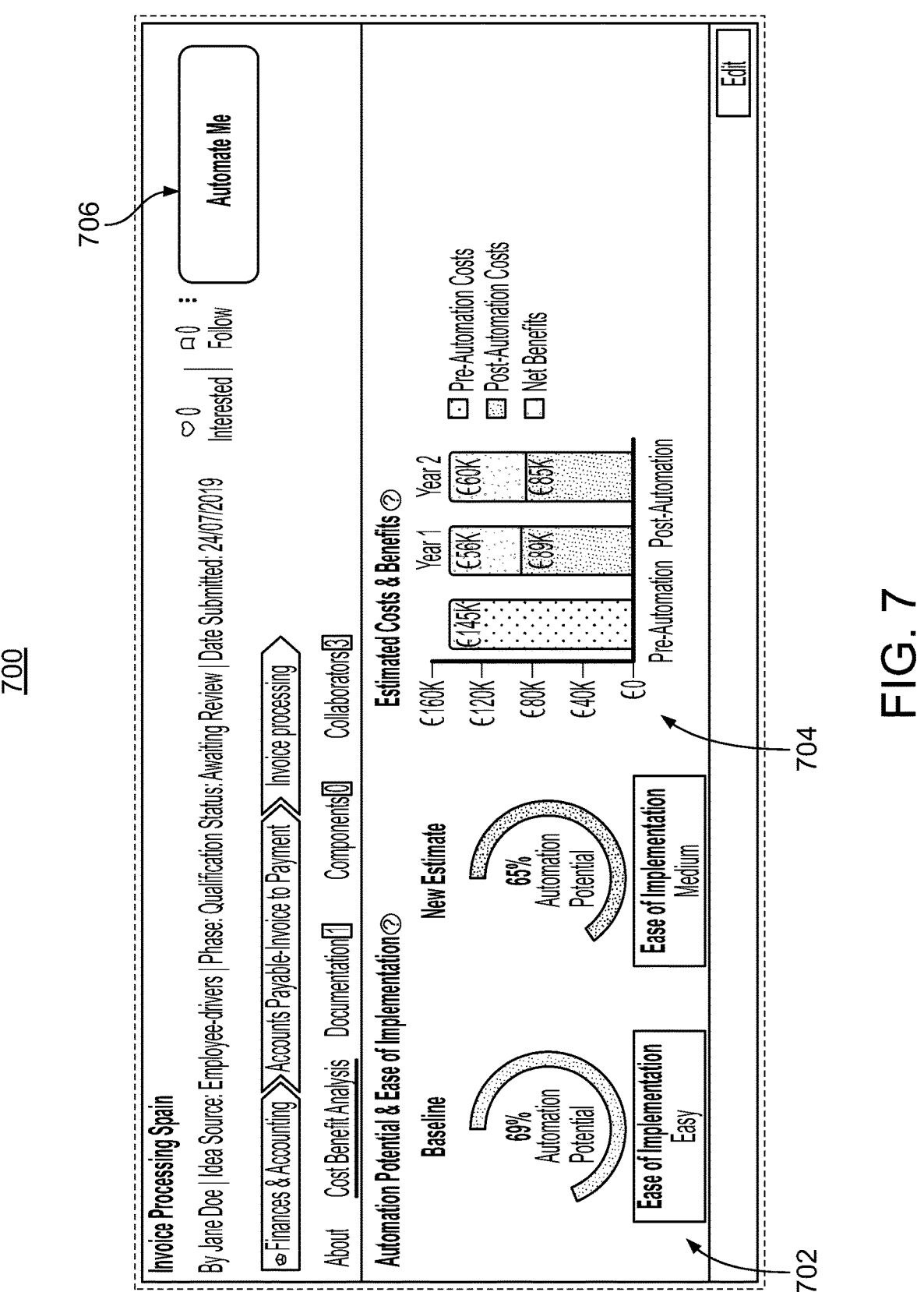
FIG. 7 shows an exemplary user interface for prompting a user to automate a candidate process automation, in accordance with one or more embodiments.

FIG. 7 shows an exemplary user interface 700 for presenting a prompt for user input to a user to automate a candidate process automation, in accordance with one or more embodiments. User interface 700 is a user interface of an automation hub presenting various metrics for automating the candidate process automation of "Invoice Processing Spain." For example, user interface 700 shows metrics 702 for automation potential and ease of implementation of the candidate process automation and metrics 704 for estimated costs and benefits of automating the candidate process automation. User interface 700 presents a prompt 706 labelled "Automate Me" to prompt the user to automate the candidate process automation.

In response to receiving the user input from the user to automate the candidate process automation, method 600 of FIG. 6 may proceed to step 608 or step 610. In one example, the user input may comprise a user selection of prompt 706 of FIG. 7.

At step 608 of FIG. 6, the RPA platform is configured based on the RPA platform design components. In one embodiment, the RPA platform is automatically configured with a candidate configuration defined based on the RPA robot design components. The candidate configuration is automatically defined based on the RPA robot design components without additional user input (e.g., to confirm or otherwise modify or further define the candidate configuration). In another embodiment, a candidate configuration automatically defined based on the RPA platform design components is presented to the user via a user interface. In this embodiment, the user may be a business user without RPA development experience and the presented candidate configuration conveys to the business user how the robot will operate (e.g., what systems it will interact with, what actions it will take, and what the impact of the robot is). In one example, the user interface uses test data or scenarios to demonstrate the RPA platform in action. In another example, the user interface shows a block diagram of the operation of the RPA platform. In another example, the user interface may have decisions that it couldn't automatically make, and so it presents options to the user to complete the configuration of the RPA platform. The user may interact with the user interface to modify and/or accept the candidate configuration and, in response to user input modifying and/or accepting the candidate configuration, the RPA platform may be configured according to the candidate configuration. The candidate process automation may be automatically performed by the configured RPA platform.

In one example shown in FIG. 5, in response to the user selecting prompt 514, RPA platform 516 may be automatically configured with robot design 518. Robot design 518 represents a candidate configuration of RPA platform 516. Robot design 518 is automatically defined with suggestions 522 representing RPA robot design components. Suggestions 522 comprise suggestions for an SAP (systems applications and products) login activity, an invoice approval application, and a vendor email robot project. Because these suggestions 522 are leveraging preexisting RPA platform components, activities, etc., robot design 518 is much simpler than an exhaustive ground up robot design would be. In another example, robot design 518 is presented to a user via a user interface. In response to receiving user input modifying and/or accepting robot design 518, RPA platform 516 may be configured according to robot design 518.

At step 610 of FIG. 6, the RPA platform design components are presented to a user. In this embodiment, the user may be an RPA developer experienced in RPA development (e.g., in a designer such as studio) and the RPA platform design components may be presented to the user in a user interface of the designer. The user may interact with the user interface to define a configuration of the RPA platform using one or more of the RPA platform design components. In response to receiving user input from the user defining the configuration, the RPA platform is configured according to the configuration. The candidate process automation may be automatically performed by the configured RPA platform.

In one example shown in FIG. 5, suggestions 522 are presented to an RPA developer via a user interface of a designer (e.g., studio). The RPA developer interacts with the user interface to define robot design 518 incorporating suggestions 522. In response to receiver user input defining robot design 518, RPA platform 516 is configured according to robot design 518.

In one embodiment, after the candidate process automation has been automatically performed by the configured RPA platform (in accordance with step 608 and/or step 610), additional discovery data relating to the performance of the candidate process automation is continuously generated. The reason for this is that automations may change. Once the changes are detected in the additional discovery data, updated RPA platform design components for configuring the RPA platform are generated in the form of automation change requests. The automation change requests are added to an automation pipeline. A user in turn has two options: 1) accept the automation change requests to automatically perform the code updates and redeployment, or 2) accept and edit the automation change requests before redeployment. The automation change requests can come as: 1) code changes recommendations with 100% confidence, 2) semi-automated code changes recommendations with lesser confidence, or 3) without code changes recommendations. For example, in FIG. 5, once RPA platform 516, which is configured with the robot design 518 defined according to suggestions 522, performs the candidate process automation, insights 520 providing ROI (return on investment) and other KPIs (key performance indicators) are determined and workflow 500 returns back to perform process mining 504 and task mining 508 on insights 520 for a next iteration and additional discovery data such as process graph 502 and task graph 506 is continuously generated. Updated RPA platform design components modifying robot design 518 may be generated and the configuration of RPA platform 516 may be automatically updated (e.g., for code changes recommendations with 100% confidence) or presented to the user for user input modifying and/or accepting the additional suggestions (e.g., for code changes recommendations with lesser confidence).

Figure 8:
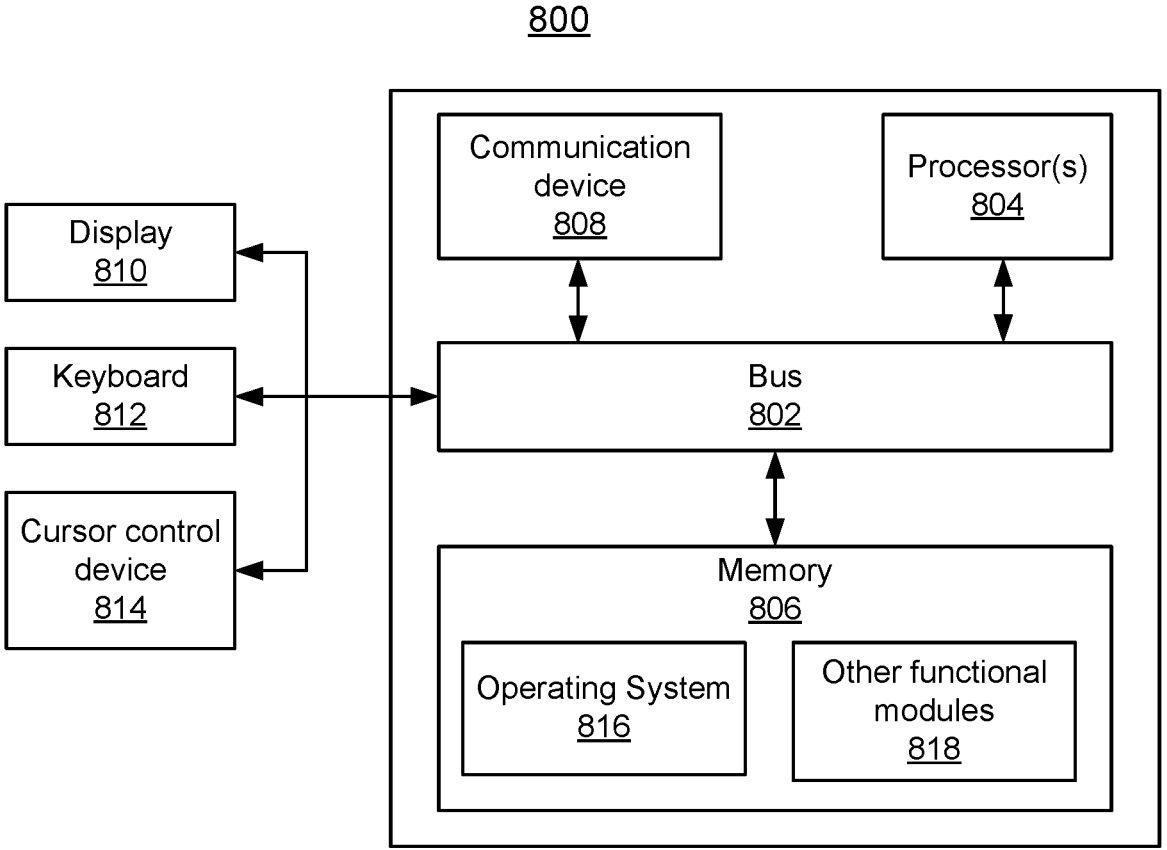
FIG. 8 is a block diagram of a computing system, which may be used to implement embodiments of the invention.

FIG. 8 is a block diagram illustrating a computing system 800. Computing system 800 may be configured to execute the methods, workflows, and processes described herein, including method 600 of FIG. 6, or may be configured to implement systems described herein, including recommendation engine 510, automation hub 512, and RPA platform 516 of FIG. 5, according to one or more embodiments of the present invention. In some embodiments, computing system 800 may be one or more of the computing systems depicted and/or described herein. Computing system 800 includes a bus 802 or other communication mechanism for communicating information, and processor(s) 804 coupled to bus 802 for processing information. Processor(s) 804 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 804 may also have multiple processing cores, and at least some of the cores may be configured to perform specific functions. Multi-parallel processing may be used in some embodiments.

Computing system 800 further includes a memory 806 for storing information and instructions to be executed by processor(s) 804. Memory 806 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 804 and may include volatile media, non-volatile media, or both. The media may also be removable, non-removable, or both.

Additionally, computing system 800 includes a communication device 808, such as a transceiver, to provide access to a communications network via a wireless and/or wired connection according to any currently existing or future-implemented communications standard and/or protocol.

Processor(s) 804 are further coupled via bus 802 to a display 810 that is suitable for displaying information to a user. Display 810 may also be configured as a touch display and/or any suitable haptic I/O device.

A keyboard 812 and a cursor control device 814, such as a computer mouse, a touchpad, etc., are further coupled to bus 802 to enable a user to interface with computing system. However, in certain embodiments, a physical keyboard and mouse may not be present, and the user may interact with the device solely through display 810 and/or a touchpad (not shown). Any type and combination of input devices may be used as a matter of design choice. In certain embodiments, no physical input device and/or display is present. For instance, the user may interact with computing system 800 remotely via another computing system in communication therewith, or computing system 800 may operate autonomously.

Memory 806 stores software modules that provide functionality when executed by processor(s) 804. The modules include an operating system 816 for computing system 800 and one or more additional functional modules 818 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
   generating discovery data relating to a candidate process automation;
   generating RPA (robotic process automation) platform design components for configuring an RPA platform to perform the candidate process automation by pattern matching activities of a task graph in the discovery data to robot activities executed by one or more robots; and
   automatically configuring the RPA platform based on the RPA platform design components.

2. The computer-implemented method of claim 1, wherein the discovery data comprises a process graph and wherein generating discovery data relating to a candidate process automation comprises:
   generating the process graph by performing at least one of process mining or process capture.

3. The computer-implemented method of claim 1, wherein the discovery data comprises a task graph and wherein generating discovery data relating to a candidate process automation comprises:
   generating the task graph by performing at least one of task mining or task capture.

4. The computer-implemented method of claim 1, wherein the RPA platform design components comprise at least one of UI (user interface) objects repository, RPA activities, RPA applications, accelerators, or existing projects of a user.

5. The computer-implemented method of claim 1, further comprising:
   automatically performing the candidate process automation by the configured RPA platform.

6. The computer-implemented method of claim 5, further comprising:
   generating additional discovery data relating to the performance of the candidate process automation;
   generating updated RPA platform design components for configuring the RPA platform; and
   presenting the updated RPA platform design components to a user.

7. The computer-implemented method of claim 1, wherein automatically configuring the RPA platform based on the RPA platform design components comprises:

automatically configuring the RPA platform based on the RPA platform design components without user input confirming, modifying, or defining the configuring of the RPA platform.

8. An apparatus comprising:

a memory storing computer program instructions; and at least one processor configured to execute the computer program instructions, the computer program instructions configured to cause the at least one processor to perform operations comprising:

generating discovery data relating to a candidate process automation;

generating RPA (robotic process automation) platform design components for configuring an RPA platform to perform the candidate process automation by pattern matching activities of a task graph in the discovery data to robot activities executed by one or more robots; and automatically configuring the RPA platform based on the RPA platform design components.

9. The apparatus of claim 8, wherein the discovery data comprises a process graph and wherein generating discovery data relating to a candidate process automation comprises:

generating the process graph by performing at least one of process mining or process capture.

10. The apparatus of claim 8, wherein the discovery data comprises a task graph and wherein generating discovery data relating to a candidate process automation comprises:

generating the task graph by performing at least one of task mining or task capture.

11. The apparatus of claim 8, wherein the RPA platform design components comprise at least one of UI (user interface) objects repository, RPA activities, RPA applications, accelerators, or existing projects of a user.

12. The apparatus of claim 8, the operations further comprising:

automatically performing the candidate process automation by the configured RPA platform;

generating additional discovery data relating to the performance of the candidate process automation;

generating updated RPA platform design components for configuring the RPA platform; and presenting the updated RPA platform design components to a user.

13. The apparatus of claim 8, wherein automatically configuring the RPA platform based on the RPA platform design components comprises:

automatically configuring the RPA platform based on the RPA platform design components without user input confirming, modifying, or defining the configuring of the RPA platform.

14. A non-transitory computer-readable medium storing computer program instructions, the computer program instructions, when executed on at least one processor, cause the at least one processor to perform operations comprising:

generating discovery data relating to a candidate process automation;

generating RPA (robotic process automation) platform design components for configuring an RPA platform to perform the candidate process automation by pattern matching activities of a task graph in the discovery data to robot activities executed by one or more robots; and automatically configuring the RPA platform based on the RPA platform design components.

15. The non-transitory computer-readable medium of claim 14, wherein the discovery data comprises a process graph and wherein generating discovery data relating to a candidate process automation comprises:

generating the process graph by performing at least one of process mining or process capture.

16. The non-transitory computer-readable medium of claim 14, wherein the RPA platform design components comprise at least one of UI (user interface) objects repository, RPA activities, RPA applications, accelerators, or existing projects of a user.

17. The non-transitory computer-readable medium of claim 14, the operations further comprising:

automatically performing the candidate process automation by the configured RPA platform;

generating additional discovery data relating to the performance of the candidate process automation;

generating updated RPA platform design components for configuring the RPA platform; and presenting the updated RPA platform design components to a user.

18. The non-transitory computer-readable medium of claim 14, wherein automatically configuring the RPA platform based on the RPA platform design components comprises:

automatically configuring the RPA platform based on the RPA platform design components without user input confirming, modifying, or defining the configuring of the RPA platform.

* * * * *